United States Patent
Coogan et al.

(10) Patent No.: US 7,439,299 B2
(45) Date of Patent: Oct. 21, 2008

(54) AQUEOUS POLYURETHANE COMPOSITION FOR LOW GLOSS COATINGS

(75) Inventors: Richard G Coogan, Wilmington, MA (US); Nikos J Georgakakis, Wilmington, MA (US); Anthony Pajerski, Wilmington, MA (US)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/540,914

(22) PCT Filed: Dec. 16, 2003

(86) PCT No.: PCT/GB03/05465

§ 371 (c)(1),
(2), (4) Date: Oct. 25, 2005

(87) PCT Pub. No.: WO2004/060949

PCT Pub. Date: Jul. 22, 2004

(65) Prior Publication Data

US 2006/0111538 A1    May 25, 2006

(30) Foreign Application Priority Data

Jan. 4, 2003   (GB)  ............... 0300225.0

(51) Int. Cl.
| | |
|---|---|
| C08G 18/10 | (2006.01) |
| C08G 18/00 | (2006.01) |
| C08G 18/06 | (2006.01) |
| C08G 18/08 | (2006.01) |
| C08G 18/28 | (2006.01) |
| B32B 27/40 | (2006.01) |

(52) U.S. Cl. ............... 524/840; 524/800; 524/839; 528/44; 528/48; 528/59; 528/60; 528/61; 528/65; 528/67; 528/71; 528/80; 528/83; 528/85; 428/423.1; 427/372.2

(58) Field of Classification Search ......... 524/591, 524/839, 840, 800; 427/372.2, 385.5, 423.1; 428/423.1; 528/44, 48, 59, 60, 61, 65, 67, 528/71, 80, 83, 85
See application file for complete search history.

(56) References Cited

U.S. PATENT DOCUMENTS 4,839,443 A * 6/1989 Akutsu et al. ............... 525/474
5,804,647 A * 9/1998 Nachtkamp et al. ......... 524/591
6,462,127 B1 * 10/2002 Ingrisch et al. ............. 524/589
6,559,225 B1 * 5/2003 Irle et al. .................... 524/839
7,094,826 B2 * 8/2006 Martin et al. ............... 524/502

FOREIGN PATENT DOCUMENTS

| EP | 332326 A2 * | 9/1989 |
| EP | 0 709 414 A1 | 5/1996 |
| WO | WO 01/02455 A1 | 1/2001 |

OTHER PUBLICATIONS

Machine Translation of EP 709414 A (1996).*

* cited by examiner

*Primary Examiner*—Sanza L McClendon
(74) *Attorney, Agent, or Firm*—Nixon & Vanderhye P.C.

(57) ABSTRACT

An aqueous coating composition having a 60° gloss of ≦40 upon drying comprising a self-crosslinkable polyurethane obtained by the reaction of:
(A) an isocyanate-terminated pre-polymer formed from components which comprise
  (i) 5 to 65 wt % of at least one organic polyisocyanate;
  (ii) 0.1 to 6 wt % of at least one polyol containing ionic or potentially ionic water-dispersing groups, having two or more isocyanate-reactive groups and having a molecular weight in the range of from 100 up to 500 g/mol;
  (iii) 0 to 30 wt % of at least one polyol containing water-dispersing groups, having two or more isocyanate-reactive groups and having a molecular weight in the range of from 500 to 6000 g/mol;
  (iv) 10 to 80 wt % of at least one polyol containing crosslinkable groups, having two or more isocyanate-reactive groups and having a molecular weight in the range of from 150 to 6000 g/mol;
  (v) 10 to 70 wt % of at least one polyol not comprised by (iii) or (iv) having two or more isocyanate-reactive groups and having a molecular weight in the range of from 500 to 6000 g/mol;
  (vi) 0 to 50 wt % of at least one component not comprised by (i), (ii), (iii),
  (iv) or (v); where (i), (ii), (iii), (iv), (v) and (vi) add up to 100 wt %; and where the NCO:OH ratio is in the range of from 1.1:1.0 to 10.0:1.0; and
(B) at least one active-hydrogen chain extending compound.

11 Claims, No Drawings

AQUEOUS POLYURETHANE COMPOSITION FOR LOW GLOSS COATINGS

This application is the US national phase of international application PCT/GB2003/005465 filed 16 Dec. 2003 which designated the U.S. and claims benefit of GB 0300225.0, dated 4 Jan. 2003, the entire content of which is hereby incorporated by reference.

The present invention relates to an aqueous coating composition having a 60° gloss of ≦40 upon drying, a process for preparing such a composition and a coating obtained from such a composition.

Coating compositions have long been used to produce coatings having desired coating characteristics. For example coating compositions are used to protect surfaces from the environment, to conceal surface irregularities, to provide a surface which is more receptive to further treatment, or to enhance the surface appearance, such as providing high gloss or low gloss.

Gloss is associated with the capacity of a surface to reflect more light in some directions than in others. High gloss surfaces reflect a high proportion of light directed at them and low gloss surfaces reflect a low proportion of light directed at them. The directions associated with mirror (or specular) reflection normally have the highest reflectances. Measurements by such a test method (as described for example in ASTM D 523-89 correlate with visual observations of surface shininess made at roughly the corresponding angles. Low gloss coatings that produce less image impairment are often more pleasing aesthetically.

Traditionally low gloss coating compositions are obtained by the addition of flattening agents such as silicone dioxide. Flattening agents are well known in the art and traditionally comprise materials ground into minute particles of irregular shape which are used in compositions such as paints and varnishes to disperse incident light rays so that a low gloss effect is achieved. Standard flattening agents include but are not limited to silica (for example amorphous silicon dioxide), diatomaceous earth, heavy metal soaps, talcum and chalk. To obtain for example low gloss in clear coats, typically more than 6 wt % of flattening agent based on the weight of the coating composition has to be added. Such compositions are disclosed in for example U.S. Pat. No. 6,284,836 B1 and EP 1186641 A1.

The disadvantages resulting from the addition of flattening agents to reduce gloss include coagulation of the composition resulting in a seedy appearance; increased brittleness of the resultant coating; settling out of the flattening agents often resulting in inconsistent mixing before application resulting in variation in gloss throughout the coating; and a decrease in burnish resistance as well as reducing the general resistance and performance properties of the coating. Burnish is the change in appearance of a coating as a result of rubbing the coating with a different material. The change in appearance may be measured as a change in the gloss level of a coating.

Low gloss coating compositions have been described in for example U.S. Pat. No. 6,331,582 B1 which discloses a thermally activated coating composition comprising an acrylic or polyester solvent based binder resin, colorant and a polyvinyl acetal matting agent. EP 0841992 A2 discloses a low gloss coating composition comprising acrylic polymer particles containing at least one void and pigments. U.S. Pat. No. 6,410,147 discloses a low gloss solvent based crosslinkable coating composition comprising a combination of a polar polymer, a non-polar polymer and a crosslinking agent. U.S. Pat. No. 5,744,522 discloses a low gloss coating powder composition comprising an acrylic copolymer, an aromatic polyester and a specific isocyanurate curing agent.

These all describe ways of avoiding the use of silicone dioxide flattening agents, however they appear to be providing complex and costly solutions, including a preference for the use of solvents and powders.

The aqueous coating composition of the present invention provides a low gloss coating preferably without the use of flattening agents. Furthermore the coating obtained from the aqueous coating composition of the present invention has a warmer look when compared with a conventional urethane coating using flattening agents. The look is very subjective and there do not appear to be any specific instrumental measurements available, however warmth may be measurable by colour tones, a cooler look may appear bluer while a warmer look may appear more white.

According to the present invention there is provided an aqueous coating composition having a 60° gloss of ≦40 upon drying comprising a self-crosslinkable polyurethane obtained by the reaction of:

(A) an isocyanate-terminated pre-polymer formed from components which comprise
  (i) 5 to 65 wt % of at least one organic polyisocyanate;
  (ii) 0.1 to 6 wt % of at least one polyol containing ionic or potentially ionic water-dispersing groups, having two or more isocyanate-reactive groups and having a molecular weight in the range of from 100 up to 500 g/mol;
  (iii) 0 to 30 wt % of at least one polyol containing water-dispersing groups, having two or more isocyanate-reactive groups and having a molecular weight in the range of from 500 to 6000 g/mol;
  (iv) 10 to 80 wt % of at least one polyol containing crosslinkable groups, having two or more isocyanate-reactive groups and having a molecular weight in the range of from 150 to 6000 g/mol;
  (v) 10 to 70 wt % of at least one polyol not comprised by (iii) or (iv) having two or more isocyanate-reactive groups and having a molecular weight in the range of from 500 to 6000 g/mol;
  (vi) 0 to 50 wt % of at least one component not comprised by (i), (ii), (iii), (iv) or
  (v); where (i), (ii), (iii), (iv), (v) and (vi) add up to 100 wt %; and where the NCO:OH ratio is in the range of from 1.2:1.0 to 10.0:1.0; and
(B) at least one active-hydrogen chain extending compound.

Gloss measurements are made with 60°, 20° or 85° geometry of angles and apertures. The 60° geometry is used for comparing most samples and for determining when the 20° geometry may be more applicable. The 20° geometry is advantageous for comparing samples having a 60° gloss value higher than 70. The 85° geometry is advantageous for comparing samples having 60° gloss values lower than 10.

Preferably the 60° gloss of the aqueous coating composition of the invention upon drying is ≦30, more preferably ≦20, most preferably ≦10, especially ≦5 and most especially ≦3.

Preferably the 85° gloss of the aqueous coating composition of the invention upon drying is ≦60, more preferably ≦40, more preferably ≦30, especially ≦20 and most especially ≦10.

The self-crosslinkable polyurethane is crosslinkable without the requirement for added compounds which react with groups on the polyurethane to achieve crosslinking, although these can still be employed if desired. Optionally the aqueous coating composition of the present invention comprises at least one post-added crosslinker in the range from 0 to 35 wt % based on solids of the self-crosslinkable polyurethane.

The self-crosslinkable polyurethane may crosslink at ambient temperature by a number of mechanisms including but not limited to autoxidation, Schiff base crosslinking and silane condensation. By crosslinking by autoxidation is meant that crosslinking results from an oxidation occurring in the presence of air and usually involves a free radical mechanism and is preferably metal-catalysed resulting in covalent crosslinks.

Suitably autoxidation is provided for example by fatty acid groups containing unsaturated bonds (by which is meant the residue of such fatty acids which have become incorporated into the polyurethane by reaction at their carboxylic acid groups) or by (meth)allyl functional residues, β-keto ester groups or β-keto amine groups. Preferably autoxidation is provided at least by fatty acid groups containing unsaturated bonds.

By Schiff base crosslinking is meant that crosslinking takes place by the, reaction of a carbonyl functional groups, where by a carbonyl functional group herein is meant an aldo or keto group and includes an enolic carbonyl group such as is found in an acetoacetyl group with a carbonyl-reactive amine and/or hydrazine (or blocked amine and/or blocked hydrazine) functional group.

By silane condensation is meant the reaction of alkoxy silane or —SiOH groups in the presence of water, to give siloxane bonds by the elimination of water and/or alkanols (for example methanol) during the drying of the aqueous coating composition.

Other crosslinking mechanisms known in the art include those provided by the reaction of epoxy groups with amino, carboxylic acid or metcapto groups, the reaction of mercapto groups with ethylenically unsaturated groups such as fumarate and acryloyl groups, the reaction of masked epoxy groups with amino or mercapto groups, the reaction of isothiocyanates with amines, alcohols or hydrazines, the reaction of amines (for example ethylenediamine or multifunctional amine terminated polyalkylene oxides) with β-diketo (for example acetoacetoxy or acetoamide) groups to form enamines. The use of blocked crosslinking groups, such as blocked isocyanate groups, may be beneficial.

Preferably the self-crosslinking is by autoxidation of unsaturated functional groups, such as conjugated unsaturated functional groups, and Schiff base crosslinking optionally in combination with other crosslinking mechanisms as discussed herein.

Methods for preparing polyurethanes are known in the art and are described in for example the Polyurethane Handbook $2^{nd}$ Edition, a Carl Hanser publication, 1994, by G. Oertel; and these methods are included herein by reference. The self-crosslinkable polyurethane may be prepared in a conventional manner by reacting at least one organic polyisocyanate with at least one isocyanate-reactive compound by methods well known in the prior art. Isocyanate-reactive groups include —OH, —SH, —NH—, and —NH$_2$. Usually an isocyanate-terminated polyurethane prepolymer is first formed which is then chain extended with an active hydrogen containing compound.

Component (i) comprises any suitable organic polyisocyanates including aliphatic, cycloaliphatic, aralphatic and/or aromatic polyisocyanates. Examples of suitable polyisocyanates include ethylene diisocyanate, 1,6-hexamethylene diisocyanate (HDI), isophorone diisocyanate (IPDI), cyclohexane-1,4-diisocyanate, 4,4'-dicyclohexylmethane diisocyanate (4,4'-H12 MDI), p-xylylene diisocyanate, p-tetramethylxylene diisocyanate (p-TMXDI) (and its meta isomer m-TMXDI), 1,4-phenylene diisocyanate, hydrogenated 2,4-toluene diisocyanate, hydrogenated 2,6-toluene diisocyanate, 4,4'-diphenylmethane diisocyanate (4,4'-MDI), polymethylene polyphenyl polyisocyanates, 2,4'-diphenylmethane diisocyanate, 3(4)-isocyanatomethyl-1-methyl cyclohexyl isocyanate (IMCI) and 1,5-naphthylene diisocyanate. Preferred organic polyisocyanates are IPDI and/or H$_{12}$MDI which provide improved low yellowing and ease of processing of the self-crosslinkable polyurethane. Mixtures of polyisocyanates can be used and also polyisocyanates which have been modified by the introduction of urethane, allophanate, urea, biuret, carbodiimide, uretonimine, urethdione or isocyanurate residues.

Preferably component (i) comprises 20 to 60 wt %, more preferably 30 to 50 wt % of the isocyanate-terminated prepolymer.

Preferably component (i) comprises organic polyisocyanates with a functionality of 2 (i.e. diisocyanates), however the polyurethane prepolymer may also be formed from additional component (ia) comprising 0 to 20 wt % of at least one organic polyisocyanate with an isocyanate functionality $\geq 2.2$, more preferably in the range of from 2.5 to 4.0.

Preferably component (ia) comprises 3 to 15 wt %, more preferably 4 to 10 wt % of the isocyanate-terminated prepolymer.

The effect of component (ia) is to allow a degree of pre-crosslinking in the prepolymer, however too much pre-crosslinkling may result in an unacceptable increase in viscosity.

Component (ii) comprises any suitable polyol, preferably diol, containing ionic or potentially ionic water-dispersing groups.

Preferred ionic water-dispersing groups are anionic water-dispersing groups. Preferred anionic water-dispersing groups are carboxylic, phosphoric and/or sulphonic acid groups. Examples of such compounds include carboxyl containing diols and triols, for example dihydroxy alkanoic acids such as 2,2-dimethylol propionic acid (DMPA) or 2,2-dimethylolbutanoic acid (DMBA). The anionic water-dispersing groups are preferably fully or partially in the form of a salt. Conversion to the salt form is optionally effected by neutralisation of the self-crosslinkable polyurethane with a base, preferably during the preparation of the self-crosslinkable polyurethane and/or during the preparation of the aqueous coating composition of the present invention.

If the anionic water-dispersing groups are neutralised, the base used to neutralise the groups is preferably ammonia, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. A quaternary ammonium hydroxide, for example $N^+(CH_3)_4(OH)$, can also be used. Generally a base is used which gives counter ions that may be desired for the composition. For example, preferred counter ions include $Li^+$, $Na^+$, $K^+$, $NH_4^+$ and substituted ammonium salts.

Cationic water dispersible groups can also be used, but are less preferred. Examples include pyridine groups, imidazole groups and/or quaternary ammonium groups which may be neutralised or permanently ionised (for example with dimethylsulphate).

Preferably component (ii) comprises 0.8 to 4.0 wt %, more preferably 1.9 to 3.0 wt % of the isocyanate-terminated prepolymer.

Component (iii) may contain ionic water-dispersing groups as discussed above and/or may also contain non-ionic water-dispersing groups. Preferably component (iii) contains anionic and/or non-ionic water-dispersing groups.

Preferred non-ionic water-dispersing groups are polyalkylene oxide groups, more preferably polyethylene oxide groups. A small segment of the polyethylene oxide group can be replaced by propylene segments and/or butylene oxide segments, however the polyethylene oxide group should still contain ethylene oxide as a major component. When the water-dispersible group is polyethylene oxide, preferably the polyethylene oxide group has a molecular weight from 175 to 5000 g/mol, more preferably from 350 to 2200 g/mol and most preferably from 660 to 2200 g/mol.

Examples of such compounds containing non-ionic water-dispersing groups include methoxy polyethylene glycol (MPEG) with molecular weights of for example 550, 750, 1000 and 2000 g/mol. Examples of such compounds containing ionic water-dispersing groups include polyether, polyester and polycarbonate polyols containing carboxylic acid groups.

Preferably component (iii) comprises 5 to 25 wt % and more preferably 8 to 20 wt % of the isocyanate-terminated prepolymer. This is especially preferred when levels of component (ii) are kept to the minimum.

The self-crosslinkable polyurethane preferably contains a sufficient concentration of ionic and/or non-ionic water-dispersing groups via components (ii) and (iii) capable of rendering the polyurethane self-water-dispersible (i.e. dispersible In water without the requirement to use added dispersing agents) but the concentration of such groups is preferably not so great that the polyurethane has an unacceptably high water solubility in order to not compromise the water sensitivity of the final coating.

Moreover, the strength of the ionic and/or non-ionic water-dispersing groups or their efficiency as a dispersing and/or stabilising group may also influence the optimal amounts required.

The crosslinkable groups contained in component (iv) may be any as discussed above which allow self-crosslinking, including but not limited to autoxidisable groups; carbonyl functional groups; carbonyl reactive amine and/or hydrazine groups; alkoxysilane or SiOH groups; epoxy groups; mercapto groups; isothiocyanate groups; hydroxy groups, blocked isocyanate groups and ethylenically unsaturated groups. Preferably component (iv) has self-crosslinkable groups selected from ethylenically unsaturated groups, carbonyl functional groups, alkoxysilane groups, epoxy groups, amino groups, mercapto groups, isothiocyanate groups and hydrazine groups. Preferably the molecular weight of component (iv) is in the range of from 150 to 4000 g/mol and more preferably in the range of from 200 to 2000 g/mol.

Preferably component (iv) comprises 15 to 60 wt % and more preferably 20 to 50 wt % of the isocyanate-terminated prepolymer.

Component (v) comprises polyols containing neither ionic or non-ionic water-dispersing groups, or crosslinker groups.

The polyols particularly include diols and triols and mixtures thereof but higher functionality polyols may be used, for example as minor components in admixture with diols. The polyols may be members of any of the chemical classes of polyols used or proposed to be used in polyurethane formulations. In particular the polyols may be polyesters, polyesteramides, polyethers, polythioethers, polycarbonates, polyacetals, polyolefins or polysiloxanes. Preferred molecular weights are from 600 to 4000, more preferably from 700 to 3000 g/mol. Preferably component (v) comprises 15 to 60 wt %, more preferably 15 to 45 wt % of the isocyanate-terminated prepolymer.

For component (vi) low molecular weight organic compounds containing at least one (preferably at least two) isocyanate-reactive groups and having a weight average molecular weight up to 500, preferably in the range of 40 to 250 can also be used. Preferably component (vi) comprises a diol having a molecular weight of 40 to 500 g/mol. Examples include ethyleneglycol, di-ethylene glycol, tri-ethylene glycol, tetra-ethylene glycol and similarly poly-glycols made from propylene glycol up to a molecular weight of 500, neopentyl glycol; 1-propanol, bis(hydroxyethyl) terapthalate, furan dimethanol, glycerol, 1,4-cyclohexyldimethanol and the reaction products of these examples with propylene and/or ethylene glycol up to a molecular weight of 500 g/mol. Preferably component (vi) comprises a polysiloxane polyol.

Preferably component (vi) comprises 0 to 40 wt %, more preferably 0 to 30 wt % of the isocyanate-terminated prepolymer.

The acid value of the self-crosslinkable polyurethane may vary considerably depending on the hydrophobicity of the polyurethane and the degree, if any, of pre-crosslinking.

The self-crosslinkable polyurethane preferably has an acid value in the range of from 0.3 to 25.1 mg KOH/g, more preferably in the range of from 0.4 to 16.7 mg KOH/g and most preferably in the range of from 0.5 to 11.7 mg KOH/g.

The Tg of a polymer herein stands for the glass transition temperature and is well known to be the temperature at which a polymer changes from a glassy, brittle state to a rubbery state. Tg values of polymers may be determined experimentally using techniques such as Differential Scanning Calorimetry (DSC) or calculated theoretically using the well-known Fox equation where the Tg (in Kelvin) of a copolymer having "n" copolymerised comonomers is given by the weight fractions "W" and the Tg values of the respective homopolymers (in Kelvin) of each comonomer type according to the equation "$1/Tg = W_1/Tg_1 + W_2/Tg_2 + \ldots W_n/Tg_n$". The calculated Tg in Kelvin may be readily converted to °C.

The self-crosslinkable polyurethane has at least one glass transition temperature (Tg) as measured by modulated differential scanning calorimetry (DSC), preferably being in the range of from −100 to 250° C., more preferably −80 to 150° C., most preferably −70 to 130° C. and especially −70 to 30° C.

The self-crosslinkable polyurethane preferably has a particle size in the range of from 500 to 5000 nm, more preferably in the range of from 900 to 3500 nm and most preferably in the range of 1000 to 2500 nm.

Not wishing to be bound to this theory, however it appears that the larger the particle size, the greater the gloss reduction when compared with a conventional particle size of around 40 to 150 nm. However an increase in particle size may also result in a decrease in stability of the polyurethane when in a dispersed state.

The self-crosslinkable polyurethane preferably has a molecular weight in the range of from 15,000 to 50,000, more preferably in the range of from 15,000 to 40,000 and especially in the range from 18,000 to 30,000 g/mol. The molecular weight may be measured by Gel Permeation Chromatography (GPC) using tetrahydrofuran as a solvent and polystyrene standards. It appears that the use of very low molecular weight polyurethanes may affect tack and hence film formation resulting in an increase in gloss.

The isocyanate-terminated polyurethane prepolymer is conventionally formed by reacting a stoichiometric excess of the organic polyisocyanate with the isocyanate-reactive compounds under substantially anhydrous conditions at a temperature between about 30° C. and about 130° C. until reaction between the isocyanate groups and the isocyanate-reactive groups is substantially complete; the reactants for the prepolymer are generally used in proportions corresponding to a ratio of isocyanate groups to isocyanate-reactive groups of from about 1.2:1 to about 6:1, preferably from about 1.4:1 to 3:1.

If desired, catalysts such as dibutyltin dilaurate and stannous octoate, zirconium or titanium based catalysts may be used to assist the isocyanate-terminated prepolymer and/or polyurethane formation. An organic solvent may optionally be added before or after prepolymer formation or final polyurethane formation to control the viscosity. Examples of solvents include water-miscible solvents such as N-methylpyrrolidinone, dimethyl acetamide, glycol ethers such as butyldiglycol, methyl ethyl ketone and alkyl ethers of glycol acetates or mixtures thereof. The solvent may also include reactive diluents such as olefinically unsaturated monomers. Optionally no organic solvents are added.

The aqueous polyurethane composition may be prepared by dispersing isocyanate-terminated polyurethane prepolymer (optionally carried in an organic solvent medium) in an aqueous medium and chain extending the prepolymer with at least one active hydrogen-containing chain extender in the aqueous phase.

Active hydrogen-containing chain extenders which may be reacted with the isocyanate-terminated polyurethane prepolymer include amino-alcohols, primary or secondary diamines or polyamines, hydrazine, and substituted hydrazines.

Examples of such chain extenders useful herein include alkylene diamines such as ethylene diamine and cyclic amines such as isophorone diamine. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulphonic acids such as adipic acid mono- or dihydrazide, oxalic acid dihydrazide, isophthalic acid dihydrazide, hydrazides made by reacting lactones with hydrazide such as gammahydroxylbutyric hydrazide, bis-semi-carbazide, and bis-hydrazide carbonic esters of glycols may be useful. Water itself may be effective as an indirect chain extender. Preferably the active-hydrogen chain extending compound is selected from the group comprising water, amino-alcohols, primary or secondary diamines or polyamines, hydrazine, substituted hydrazines and substituted hydrazides.

Where the chain extender is other than water, for example, a polyamine or hydrazine, it may be added to the aqueous dispersion of the isocyanate-terminated polyurethane prepolymer or, alternatively, it may already be present in the aqueous medium when the isocyanate-terminated polyurethane prepolymer is dispersed therein. The isocyanate-terminated polyurethane prepolymer may also be chain extended to form the polyurethane while dissolved in organic solvent (usually acetone) followed by the addition of water to the solution until water becomes the continuous phase and the subsequent removal of the solvent by distillation to form an aqueous dispersion.

The chain extension may be conducted at convenient temperatures from about 5° C. to 95° C. or, more preferably, from about 10° C. to 60° C.

The total amount of active-hydrogen chain extending compound employed (apart from water) should be such that the ratio of active hydrogens in the chain extender to isocyanate groups in the polyurethane prepolymer preferably is in the range from 0.1:1 to 2.0:1 more preferably 0.80:1 to 1.7:1.

In another embodiment of the present invention there is provided a process for preparing the aqueous coating composition comprising the following steps:

a) reaction of components (i) to (vi) to form an isocyanate-terminated prepolymer (A);
b) forming an aqueous dispersion of the isocyanate-terminated prepolymer (A) in water;
c) optionally neutralising the isocyanate-terminated prepolymer (A) after and/or during step a) and/or step b).
d) chain extension of the isocyanate-terminated prepolymer (A) by reaction with the active-hydrogen chain extending compound (B); and
e) optionally adding crosslinker.

The process may additionally comprise step f) the addition and subsequent polymerisation of a reactive diluent.

Steps b), c), d), e) and f) may be in any order.

Surfactants and/or high shear can be utilised in any order to any assist in the dispersion of isocyanate-terminated prepolymer or the polyurethane in water (even if it is self-dispersible). Suitable surfactants include but are not limited to conventional anionic, cationic and/or nonionic surfactants such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$, alkyl sulphates, alkali metal salts of sulphonic acids; fatty alcohols, ethoxylated fatty acids and/or fatty amines, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and polyethylene oxide compounds. The amount of surfactant used is preferably 0 to 15% by weight, more preferably 0 to 8% by weight, still more preferably 0 to 5% by weight, especially 0.1 to 3% by weight, and most especially 0.3 to 2% by weight based on the weight of the self-crosslinkable polyurethane.

In a further embodiment of the present invention if a reactive diluent is employed, in particular where the reactive diluent comprises olefinically unsaturated monomers (also known as vinyl monomers) these may be polymerised in-situ to prepare a vinyl polymer. Suitable vinyl monomers include but are not limited to (meth)acrylic acid, fumaric acid, itaconic acid, 1,3-butadiene, isoprene, styrene, α-methyl styrene, divinyl benzene, indene, acrylonitrile, methacrylonitrile, vinyl halides such as vinyl chloride, vinyl esters such as vinyl acetate, vinylpropionate, vinyl laurate, vinyl esters of versatic acid, heterocyclic vinyl compounds, alkyl esters of mono-olefinically unsaturated dicarboxylic acids (such as di-n-butyl maleate and di-n-butyl fumarate) and, in particular, esters of (meth)acrylic acid of formula $CH_2=CR^1—COOR^2$ wherein $R^1$ is H or methyl and $R^2$ is optionally substituted alkyl or cycloalkyl of 1 to 20 carbon atoms (more preferably 1 to 8 carbon atoms) examples of which are methyl (meth)acrylate, ethyl (meth)acrylate, trifluorethyl (meth)acrylate, n-butyl (meth)acrylate, 2-ethylhexyl (meth)acrylate, isopropyl (meth)acrylate, n-propyl (meth)acrylate, and hydroxyalkyl (meth)acrylates such as 2-hydroxyethyl (meth)acrylate, 2-hydroxypropyl (meth)acrylate and 4-hydroxybutyl (meth)acrylate.

Preferably the reactive diluent comprises vinyl monomers selected from at least one member of the group containing free vinyl acids, esters of (meth)acrylic acid, hydroxy alkyl (meth)acrylates and styrene.

All of the vinyl monomers may be present at the commencement of the preparation of the isocyanate-terminated prepolymer or some or all of the vinyl monomers may be added during the course of the preparation.

Preferably the vinyl monomers are not polymerised until after chain extension has been carried out.

The polymerisation of any vinyl monomer will require the use of a free-radical-yielding initiator to initiate the vinyl polymerisation. Suitable free-radical-yielding initiators include inorganic peroxides such as ammonium persulphate hydrogen peroxide, organic peroxides, such as benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as iso-ascorbic acid. Azo compounds such as azobisisobutyronitrile may also be used. Metal compounds such as Fe.EDTA (EDTA is ethylene diamine tetracetic acid) may also be usefully employed as part of the redox initiator system. The amount of initiator or initiator system to use is conventional, e.g. within the range of 0.05 to 6 wt % based on the weight of vinyl monomer used.

Such an aqueous vinyl polymerisation normally would need to be performed in the presence of an external stabilising and/or dispersing material such as the surfactants discussed above and the amount used is usually 0.1 to 5% by weight based on the total vinyl monomer used.

The theoretical glass transition temperature, calculated using the Fox equation, of the resultant vinyl polymer may vary within a wide range, a preferred range being from −50 to 120° C., preferably from −20 to 80° C.

After polymerisation, the free vinyl monomer content in the aqueous composition of the invention is preferably less than 500 ppm, more preferably less than 300 ppm and more preferably less than 100 ppm.

If a reactive diluent comprising vinyl monomers is used, the ratio of resultant vinyl polymer to self-crosslinkable polyurethane is preferably in a weight ratio in the range of from 10:90 to 90:10, more preferably 20:80 to 60:40 and most preferably 30:70 to 50:50.

The aqueous composition of the present invention typically has a solids content of from about 20 to 60% by weight, more preferably from 25 to 55% by weight.

The aqueous composition of the present invention may contain other conventional ingredients including coalescing organic solvents, pigments, dyes, emulsifiers, surfactants, thickeners, heat stabilisers, levelling agents, anti-cratering agents, fillers, sedimentation inhibitors, UV absorbers, anti-oxidants and the like introduced at any stage of the preparation process or subsequently. It is possible for example to include an amount of antimony oxide in the dispersions to enhance the fire retardant properties.

Typically a flattening agent when added at 5% by weight of the self-crosslinkable polyurethane reduces the gloss at 60° by ≧30%. Preferably the aqueous composition of the invention contains <5% by weight of flattening agent, more preferably ≦4.5%, most preferably ≦4%, especially ≦2%, more especially ≦1% and most especially contains in the range of from 0 to 0.5 wt % of flattening agent by weight of the self-crosslinkable polyurethane.

In particular the aqueous composition of the invention if comprising autoxidisable groups on the self-crosslinkable polyurethane advantageously includes at least a drier salt. Drier salts are well known to the art for further enhancing autoxidation in unsaturated fatty acid residue containing film-forming substances. Generally speaking, drier salts are metallic soaps, that is salts of metals and long chain carboxylic acids or metal naphthanates. It is thought that the metallic ions effect the curing -action in the film coating and the fatty acid components confer compatibility in the coating medium.

The most important drier metals are cobalt, manganese, zirconium, lead and calcium. The level of drier salt in the composition is typically that to provide an amount of metal within the range of from 0.01 to 0.5% by weight based on the weight of the self-crosslinkable polyurethane.

Drier salts are conventionally supplied as solutions in common organic solvents. They may, however, be used quite satisfactorily in aqueous coating composition since they can normally be dispersed in such systems fairly easily. The drier salt may be incorporated into the composition at any convenient stage.

Other useful ingredients in the aqueous composition include rheology modifiers and urethane associative thickeners such as hydrophobe-modified, ethylene oxide urethane (HEUR) which provides stabilisation and modifies the rheology by acting as a thickener. A potential disadvantage of such materials (HEUR) however is that they may contribute to water-sensitivity in the final coating.

Thus in a further embodiment of the present invention there is provided an aqueous coating composition comprising:

I) 40 to 80 wt %, preferably 50 to 70 wt % of water;

II) 0 to 30 wt %, preferably 0 to 20 wt % of co-solvent;

III) 20 to 60 wt %, preferably 30 to 50 wt % of the self-crosslinkable polyurethane defined above;

IV) 0 to 10 wt %, preferably 0 to 7 wt % of hydrophobe modified ethylene oxide urethane;

V) 0 to 16 wt %, preferably 0 to 10 wt %, more preferably 0 to 5 wt % of surfactants;

VI) 0 to 10 wt %, preferably 0.5 to 4 wt % of thickeners; and

VII) 0 to 3 wt %, preferably 0 to 1 wt % of alkyd drying agent, accelerator and/or activator;

where I), II), III), IV), V), VI) and VII) add up to 100%.

The aqueous coating composition of the present invention is particularly useful as a coating composition or for providing the principle component of coating compositions (e.g. protective or decorative coating compositions) for which purpose they may be further diluted with water and/or organic solvents, or they may be supplied in more concentrated form by evaporation of water and/or organic components of the liquid medium. As coating compositions, they may be applied to a variety of substrates including wood, board, metal, stone, concrete, glass, cloth, leather, paper, plastics, foam and the like, by conventional methods including brushing, dipping, flow coating, spraying, and the like. They are, however, particularly useful for providing coatings on wood and board substrates. The aqueous liquid medium usually comprising water and any co-solvent is removed by natural or accelerated (by heat) drying to form a coating.

There is further provided according to the present invention a coating obtained from an aqueous composition according to the present invention.

There is also provided a coated substrate having a coating comprising an aqueous coating composition according to the present invention; and a method for coating a substrate using an aqueous coating composition according to the present invention comprising a) application of the aqueous coating composition to the substrate and b) removal of the water and any co-solvent.

The present invention is now illustrated by reference to the following example. Unless otherwise specified, all parts, percentages and ratios are on a weight basis.

EXAMPLES

| Abbreviations used | |
|---|---|
| Milfester 9-55 | Hexane diol-neopentyl glycol adipate polyester polyol available (average molecular weight 2000 g/mol) from Polyurethane Specialties Company Inc. |
| U7380 | Proprietary alkyd self-crosslinking diol (average molecular weight 970 g/mol) available from NeoResins Inc. |
| DMPA | Dimethylol propionic acid. |
| DC 1248 fluid | Polyhydroxyl polydimethylsiloxane polyol (Data sheet data: average molecular weight 2000 g/mol) available from Dow Corning. |
| NMP | N-methyl pyrrolidinone. |
| IPDI | Isophorone diisocyanate. |
| F-820 | Di-butyl tin dulaurate catalyst available from Ferro Corporation. |
| Desmodur ™ N-3200 | A polyisocyanate based on the biuret of hexamethylene diisocyanate available from Bayer. |
| TEA | Triethyl amine. |
| $H_2O$ | Deionised water. |
| DSX-1514 | A proprietary urethane associative thickener available from Henkel Corporation. |
| Triton ™ X-405 | A proprietary non-ionic surfactant available from Union Carbide/Dow. |
| Dapro 7007 | Catalyst/accelerator for alkyd cure available from Elementis Specialties. (Dapro is a trade name of Elementis Specialties). |
| NeoRez ™ R-9403 | A self-crosslinking uralkyd dispersion (to promote film formation) available from NeoResins Inc. |
| $N_2H_4$ (64%) | Hydrated hydrazine solution available from Aldrich Co. |
| NCO | Isocyanate group. |
| OH | Hydroxyl group. |
| NeoRez ™ R-9637 | Commercially available polyurethane dispersion from NeoResins Inc. |
| SLS | Sodium Lauryl Sulphonate available from Rhodia as Rhodapon SB-8208/5. (Rhodapon is a trade name of Rhodia). |
| Silica | Acematt ™ TS 100 available from Degussa Corporation, particle size 4 µm. |

Example 1 and Example 2

The components used to prepare the isocyanate terminated prepolymer and to subsequently prepare the aqueous composition of the invention are listed in Table 1 below.

TABLE 1

| | Prepolymer | | | | |
|---|---|---|---|---|---|
| | | Example 1 | | Example 2 | |
| Item No. | Material | Wt (g) | Wt % | Wt (g) | Wt (%) |
| 1 | Millester 9-55 | 109 | 29.2 | 109 | 27.6 |
| 2 | U7380 | 109 | 29.2 | 109 | 27.6 |
| 3 | DMPA | 8.7 | 2.3 | 8.7 | 2.2 |
| 4 | DC 1248 fluid | 20 | 5.3 | 20 | 5 |
| 5 | NMP | 34 | — | 34 | — |
| 6 | IPDI | 106 | 28.4 | 106 | 26.8 |
| 7 | F-820 | 0.2 | — | 0.2 | — |
| 8 | Desmodur N-3200 | 21 | 5.6 | 42 | 10.6 |
| 9 | TEA | 10.5 | — | 10.5 | 10.5 |
| Prepolymer (Items 1 to 7) NCO:OH ratio | | 2.0 | | 2.0 | |
| Theoretical NCO % (prior to adding items 8 & 9) | | 5.18% | | 5.18% | |
| Theoretical final adjusted NCO % (after adding items 8 & 9) | | 5.95% | | 6.78% | |

TABLE 1-continued

| | Aqueous self-crosslinkable polyurethane | | |
|---|---|---|---|
| Item No. | Material | Wt (g) | Wt (g) |
| 10 | $H_2O$ | 520 | 520 |
| 11 | DSX-1514 | 9.2 | 2 |
| 12(a) | Triton ™ X-405 | 6.2 | 7.2 |
| 12(b) | SLS | — | 1 |
| 13 | Dapro 7007 | 2 | 2 |
| 14 | NeoRez ™ R9403 | 116 | 116 |
| 15 | Prepolymer | 320 | 320 |
| 16 | $N_2H_4$ (64%) | 8.6 | 8.6 |

Example 3 and Example 4

The components used to prepare the isocyanate terminated prepolymer and to subsequently prepare the aqueous composition of the invention are listed in Table 2 below.

TABLE 2

| | Prepolymer | | | | |
|---|---|---|---|---|---|
| | | Example 3 | | Example 4 | |
| Item No. | Material | Wt (g) | Wt % | Wt (g) | Wt (%) |
| 1 | Millester 9-55 | 109 | 30.8 | 109 | 28.9 |
| 2 | U7380 | 109 | 30.8 | 109 | 28.9 |
| 3 | DMPA | 8.7 | 2.5 | 8.7 | 2.3 |
| 4 | DC 1248 fluid | 20 | 5.6 | 20 | 5.3 |
| 5 | NMP | 34 | — | 20 | — |
| 6 | IPDI | 107 | 30.3 | 110 | 29.1 |
| 7 | F-820 | 0.2 | — | 0.2 | — |
| 8 | Desmodur ™ N-3200 | 0 | — | 21 | 5.5 |
| 9 | TEA | 10.5 | — | 9.8 | — |
| prepolymer (Items 1 to 7) NCO:OH ratio | | 2.0 | | 2.05 | |
| Theoretical NCO % (prior to adding items 8 & 9) | | 5.21% | | 5.64% | |
| Theoretical final adjusted NCO % (after adding items 8 & 9) | | 5.07% | | 6.41% | |

| | Aqueous self-crosslinkable polyurethane | | |
|---|---|---|---|
| Item No. | Material | Wt (g) | Wt (g) |
| 10 | $H_2O$ | 520 | 520 |
| 11 | DSX-1514 | 5 | 9 |
| 12(a) | Triton ™ X-405 | 7 | 2 |
| 12(b) | SLS | 0 | 6 |
| 13 | Dapro 7007 | 2 | 0.7 |
| 14 | NeoRez ™ R9403 | 116 | 58 |
| 15 | Prepolymer | 320 | 320 |
| 16 | $N_2H_4$ (64%) | 9.1 | 11.5 |

Comparative Example 5

The components used to prepare an isocyanate prepolymer with more than 6 wt % of a polyol with ionic water-dispersing groups and to subsequently prepare the comparative aqueous composition are listed in Table 3 below:

TABLE 3

Prepolymer

| | | Comparative Example 5 | |
|---|---|---|---|
| Item No. | Material | Wt (g) | Wt % |
| 1 | Millester 9-55 | 109 | 20.5 |
| 2 | U7380 | 109 | 20.5 |
| 3 | DMPA | 50 | 9.4 |
| 4 | DC 1248 fluid | 20 | 3.8 |
| 5 | NMP | 34 | — |
| 6 | IPDI | 243.5 | 45.8 |
| 7 | F-820 | 0.2 | — |
| 8 | Desmodur ™ N-3200 | 0 | — |
| 9 | TEA | 60.2 | — |
| Prepolymer (Items 1 to 7) NCO:OH ratio | | 2.0 | |
| Theoretical NCO % (prior to adding items 8 & 9) | | 8.14% | |
| Theoretical final adjusted NCO % (after adding items 8 & 9) | | 7.36% | |

Aqueous self-crosslinkable polyurethane

| Item No. | Material | Wt(g) |
|---|---|---|
| 10 | H₂O | 520 |
| 11 | DSX-1514 | 5 |
| 12(a) | Triton ™ X-405 | 7 |
| 12(b) | SLS | 0 |
| 13 | Dapro 7007 | 2 |
| 14 | NeoRez ™ R9403 | 116 |
| 15 | Prepolymer | 320 |
| 16 | N₂H₄ (64%) | 13.2 |

Procedure for Examples 1 to 4, Comparative Example 5

Stage 1:

The isocyanate-terminated prepolymer was prepared in the following manner: items 1 to 5 were loaded into the reactor and the temperature adjusted to 55 to 60° C. while stirring/mixing was applied. At 55 to 60° C. item 6 was loaded into the reactor containing items 1 to 5 and the temperature adjusted to 80 to 82° C. and held for 45 minutes at which time item 7 was then added. The reaction was allowed to proceed for an additional 1.75 hours at 80 to 82° C., or until the theoretical NCO % was reached (as determined by a wet analysis of the prepolymer). (Typically the actual NCO % when the prepolymer is "finished" is 92 to 98% of theoretical when measured by wet analysis). After reaching the theoretical NCO % the prepolymer cooling was started to bring the temperature of the prepolymer to 68 to 70° C. During this cooling process item 8 was added to the prepolymer reactor and homogenised with stirring. When the prepolymer reached 68 to 70° C. item 9 was added to the prepolymer and homogenised with mixing. Items 10 to 14 were placed in a dispersion vessel sequentially and homogenised with adequate stirring and the temperature adjusted to 18 to 20° C. The prepolymer (item 15) was then dispersed into the homogenised mixture adjusting the stir/shear rate to improve dispersing of the prepolymer if necessary while maintaining the temperature at ≦28° C. After the given amount of prepolymer was dispersed stirring was continued for an additional 3 to 5 minutes after which item 16 was added to the dispersion to provide the chain extended self-crosslinkable polyurethane. Item 16 was allowed to react with stirring over a period of 45 to 60 minutes before the polyurethane was then packaged.

The final dispersion of Examples 1 and 2 typically had a solids level of about 31% by weight, a viscosity of 300 to 700 mPa·s and a pH of 7.5 to 8.5.

The final dispersion of Examples 3 and 4 had a solids level of about 33 to 34% by weight, a viscosity of 300 to 600 mPa·s and a pH of 7.5 to 8.5.

Comparative Example 5 had a solids level of 33% by weight, a viscosity of 160 mPa·s and a pH of 9.7.

Example 6

The prepolymer prepared in Example 3 was dispersed into water containing just the hydrazine (item 17) and not items 11 to 15, to give Example 6 comprising a self-crosslinkable aqueous polyurethane, with a solids level of 33.1% by weight, a viscosity of 150 mPa·s and a pH of 8.3.

Example 7

Example 3 was repeated with 40 g instead of 20 g of item 4 (DC 1248), with a resultant solids level of 33.1% by weight, a viscosity of 1500 mPa·s and a pH of 8.8.

Example 8

Example 3 was repeated with 125.4 g instead of 109 g of item 1 (Millester 9-55) with a resultant solids level of 33.4% by weight, a viscosity of 1170 mPa·s and a pH of 8.6.

Particle Sizes:

The particle sizes of the resultant self-crosslinkable polyurethane in Examples 1 to 8 and Comparative Example 5 were in the range of from 1000 to 2000 nm.

Gloss Measurements

Gloss measurements were carried out on a BYK Gardner micro-TRI-gloss 20-60-85 glossmeter in accordance with ASTM D523-89, the results are shown in Table 4 below, and confirm that the use of sufficient flattening agent to obtain low gloss values in conventional systems such as NeoRez™ R9637 (comparative examples 9 to 11) may lead to a lack of stability and ease of handling of the composition, when compared with the composition of the present invention.

TABLE 4

| | 60° Gloss | 85° Gloss | Stability |
|---|---|---|---|
| Example 1 | 1.0 | 34.2 | ✓ |
| Example 2 | 1.1 | 3.1 | ✓ |
| Example 3 | 1.1 | 11.5 | ✓ |
| Example 4 | 0.8 | 24 | ✓ |
| Comparative Example 5 | 91.1 | 96.5 | ✓ |
| Example 6 | 1.5 | 1.2 | settled |
| Example 7 | 2.9 | 9.3 | ✓ |
| Example 8 | 1.7 | 9.5 | ✓ |
| Comparative Example 9 NeoRez ™ R9637 | 90.6 | 98.6 | ✓ |
| Comparative Example 10 NeoRez ™ R9637 + 5% silica | 10.9 | 30.5 | ✓ |
| Comparative Example 11 NeoRez ™ R9637 + 25% silica | 7.7 | 41.1 | x | key: — = not measured

The invention claimed is:

1. An aqueous coating composition having a 60° gloss of ≦30 upon drying comprising a self-crosslinkable polyurethane having an average particle size in the range of from 500 nm to 5000 nm obtained by the reaction of:

(A) an isocyanate-terminated pre-polymer formed from components which comprise,
  (i) 5 to 65 wt % of at least one organic polyisocyanate;
  (ii) 0.8 to 4 wt % of at least one polyol containing ionic or potentially ionic water-dispersing groups, having two or more isocyanate-reactive groups and having an average molecular weight in the range of from 100 up to 500 g/mol;
  (iii) 5 to 25 wt % of at least one polyol containing water-dispersing groups, having two or more isocyanate-reactive groups and having an average molecular weight in the range of from 500 to 6000 g/mol;
  (iv) 10 to 80 wt % of at least one polyol containing crosslinkable groups, having two or more isocyanate-reactive groups and having an average molecular weight in the range of from 150 to 6000 g/mol;
  (v) 10 to 70 wt % of at least one polyol not comprised by (iii) or (iv) having two or more isocyanate-reactive groups and having an average molecular weight in the range of from 500 to 6000 g/mol;
  (vi) 0 to 50 wt % of at least one component not comprised by (i), (ii), (iii), (iv) or (v); where (i), (ii), (iii), (iv), (v) and (vi) add up to 100 wt %; and where the NCO: OH ratio is in the range of from 1.1:1.0 to 10.0:1.0; and
(B) at least one active-hydrogen chain extending compound.

2. An aqueous coating composition according to claim 1 having a 85° gloss of ≦60.

3. An aqueous coating composition according to anyone of the preceding claims containing <5% by weight of flattening agent by weight of the self-crosslinkable polyurethane.

4. An aqueous coating composition according to claim 1 additionally comprising component (ia) 0 to 20 wt % of at least one organic polyisocyanate with an isocyanate functionality ≧2.2, where (i), (ii), (iii), (iv), (v), (vi)+(ia) add up to 100 wt %.

5. An aqueous coating composition according to claim 1 wherein component (vi) comprises a polysiloxane polyol.

6. An aqueous coating composition comprising:
  I) 40 to 80 wt % of water;
  II) 0 to 30 wt % of co-solvent;
  III) 20 to 60 wt % of the self-crosslinkable polyurethane according to claim 1;
  IV) 0 to 10 wt % of hydrophobe modified ethylene oxide urethane;
  V) 0 to 16 wt % of surfactants;
  VI) 0 to 10 wt % of thickeners; and
  VII) 0 to 3 wt % of alkyd drying agent, accelerator and/or activator;
  where I), II), III), IV), V), VI) and VII) add up to 100%.

7. A coating obtained from an aqueous coating composition according to claim 1.

8. A coated substrate having a coating comprising an aqueous coating composition according to claim 1.

9. A method of coating a substrate using an aqueous coating composition according to claim 1, comprising (a) application of the aqueous coating composition to a substrate and (b) removal of the water and any co-solvent.

10. A process for preparing an aqueous coating composition according to claim 1 comprising the following steps:
  a) reaction of components (i) to (vi) to form an isocyanate-terminated prepolymer (A);
  b) forming an aqueous dispersion of the isocyanate-terminated prepolymer (A) in water;
  c) optionally neutralising the isocyanate-terminated prepolymer (A) after and/or during step a) and/or step b);
  d) chain extension of the isocyanate-terminated prepolymer (A) by reaction with the active-hydrogen chain extending compound (B); and
  e) optionally adding crosslinker.

11. An aqueous coating composition according to claim 1 additionally comprising a reactive diluent.

* * * * *